(12) United States Patent
Kawasaki (10) Patent No.: US 6,539,375 B2
(45) Date of Patent: *Mar. 25, 2003

(54) METHOD AND SYSTEM FOR GENERATING AND USING A COMPUTER USER'S PERSONAL INTEREST PROFILE

(75) Inventor: Charles Kawasaki, Portland, OR (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,392

(22) Filed: Aug. 4, 1999

(65) Prior Publication Data

US 2001/0011264 A1 Aug. 2, 2001

Related U.S. Application Data

(60) Provisional application No. 60/095,296, filed on Aug. 4, 1998.

(51) Int. Cl.[7] ............................................... G06F 17/30
(52) U.S. Cl. ............................. 707/5; 707/10; 705/37; 706/16; 709/218
(58) Field of Search ........................ 707/5, 6, 4, 104; 709/217–219; 705/7–11, 37; 706/15, 16

(56) References Cited

U.S. PATENT DOCUMENTS

| 5,343,251 A | * | 8/1994 | Nafeh ......................... 348/571 |
| 5,504,884 A | * | 4/1996 | Kyuma et al. .................. 707/5 |
| 5,794,210 A | * | 8/1998 | Goldhaber et al. ........... 705/14 |
| 5,855,015 A | * | 12/1998 | Shoham .......................... 707/5 |
| 5,907,677 A | * | 5/1999 | Glenn et al. ................. 709/206 |
| 5,911,043 A | * | 6/1999 | Duffy et al. ................. 709/213 |
| 5,970,482 A | * | 10/1999 | Pham et al. ................... 706/16 |

(List continued on next page.)

OTHER PUBLICATIONS

"Learning User Profiles for Personalized Information Dissemination," Ah–Hwee Tan et al., Proceedings of the 1998 IEEE International Conference on Neural Network, vol. 1, May 4–9, 1998, pp. 183–188.*

"Intelligent Agents for Matching Information Providers and Consumers on the World–Wide Web," Lee et al., Proceedings of the 30th International Conference on System Sciences, Jan. 7, 1997, pp. 189–199, vol. 4, IEEE 97TB100234.*

"Categorizing Web Documents Using Competitive Learing: An Ingredient of a Personal Adaptive Agent," Khan et al., Proceedings of the International conference on Neural Networks, Jun., 1997, vol. 1, pp. 96–99, IEEE 97CH36109.*

(List continued on next page.)

Primary Examiner—Hosain T. Alam
(74) Attorney, Agent, or Firm—Senninger, Powers, Leavitt & Roedel (57) ABSTRACT

A method and system of this invention that provides for profiling a user of the Internet according to predefined categories of interest is described herein. This invention includes scanning content information of an Internet user to generate unknown data and processing unknown data to determine its relevance to predefined categories of interest. This relevance is indicated in a matching rating system, analyzing attributes such as length of time reviewing content information, frequency of encounter, recency, strength and closeness. With comparisons such as these, this invention generates a match of the unknown data with the predefined categories to form a profile of the user that may ultimately be used to target offers to users based upon the profile.

32 Claims, 4 Drawing Sheets

U.S. PATENT DOCUMENTS

| | | | | |
|---|---|---|---|---|
| 5,995,943 A | * | 11/1999 | Bull et al. | 705/14 |
| 6,014,638 A | * | 1/2000 | Burge et al. | 705/27 |
| 6,067,539 A | * | 5/2000 | Cohen | 707/2 |
| 6,256,633 B1 | * | 7/2001 | Dharap | 707/10 |
| 6,266,664 B1 | * | 7/2001 | Russell-Falla et al. | 707/5 |

OTHER PUBLICATIONS

"Assistant for an Information Database," Fruchtl et al., Proceedings of he 6th International conference on information and Knowledge Management, Las Vegas, Nevada, USA, Jan., 1997, pp. 230–237.*

"Information Filtering for the Newspaper," Nakashima et al., Proceedings of the 1997 IEEE Pacific Rim Conference on Communications, vol. 1, pp. 142–145, Aug. 1997.*

"A Framework for Targeting Banner Advertising on the Internet," Gallagher et al., Proceedings of the 13th Hawaii International Conference on System Sciences, IEEE, vol. 4, pp. 265–274, Jan. 1997.*

* cited by examiner

METHOD AND SYSTEM FOR GENERATING AND USING A COMPUTER USER'S PERSONAL INTEREST PROFILE

RELATED APPLICATION DATA

This application is a continuation of U.S. Provisional Application No. 60/095,296 filed Aug. 4, 1998.

FIELD OF THE INVENTION

This invention relates to the Internet and more particularly to a method and system for monitoring the use of the Internet by users and generating profile data for use in targeting users according to their interests.

BACKGROUND OF THE INVENTION

Users of Internet services ("Users") now include families, children, business people, students, hobbyists and enthusiasts of all types. They use the Internet from home, work and school.

Users of Internet services ("Services") are rapidly becoming familiar with (and are beginning to expect) new Services for "free." These "free" systems and Services are able to provide low-cost applications and services by supporting their infrastructures through the use of, and exploitation of, large audiences. The Services provide an infrastructure into which marketing and advertising companies ("Advertisers") market their products and services through the placement of on-line promotional offers and on-line advertisements ("Offers"). This model is similar to the ubiquitous network TV model of free programming, with commercial breaks. Even paid-for Services on the Internet have begun "mining" this source of value, through placing advertisements in key locations. Offers have begun to take on a variety of forms, including Web-based banner ads, e-mails, pop-up screens and video interstitials. Additionally, Services have begun to use more traditional means to target Offers, including print campaigns, radio and direct mail.

Examples of these Services on the Internet include "free" search engines and directories such as Yahoo and Infoseek, "free" e-mail systems such as HotMail, "free" instant messaging systems such as ICQ and "free" information broadcast systems such as PointCast Network.

The revenue generated by these Services in 1997 was nearly $1 billion and was in large part generated by charging Advertisers on a "thousands of impressions" model. This is commonly understood in the advertising industry as selling advertisements by "CPM"—a measure of 1,000 "impressions." Impressions are counted as one impression for each time a potential customer of the Advertiser's product sees the Offer. This is commonly understood in the Internet industry as "page views." Common "page view" prices currently range from $10 to $400 per 1,000 CPM (one million page views).

The CPM price varies widely, based on the appropriateness (or demographic match) of the User to the Offer. For example, the CPM price for an Internet search service that caters to the broadest categories of Users may command a very low CPM such as $20. The CPM price for a highly targeted audience, such as a membership-based medical information Web site that has a well-known group of subscribers suffering from a specific disease, may run as high as $450. The economics of these models work to drive specific Advertisers to specific Services. For example, drug and health product Advertisers can justify paying $450 per CPM on health-specific sites, because they are able to reach highly targeted audiences that have a great match and affinity to their Offer.

However, the economic model presented by many Services to Advertisers is highly inefficient. Advertising on Services such as Web sites generally generate between a 1% and 10% response rate, with 2% as a typical response rate. There are numerous reasons for poor response rates such as 2%, including poor or unappealing designs of the Offer, but one of the main reasons for poor response rates is simply that an Offer is tendered to Users who have no interest in the product, service and/or subject matter. For example, Advertisers of golfing equipment or luxury automobiles have little assurance that placing Offers on Services such as CNN.com or Time Warner's pathfinder.com will result in their messages reaching a high percentage of their target audiences.

Services can provide extremely attractive mediums for Advertisers by improving the match between the subject of the Offer and a User's interests. A small improvement in response rate for Advertisers, even as small as 2%, can substantially improve the economics of placing Offers in Services. Thus Advertisers and Services have great interest in techniques of measuring and improving the match of Offer to User. These techniques are known as "Offer targeting." With improved Offer targeting, Services can profit dramatically by sharing in the improved performance by increasing the CPM price for their systems.

Some Services have attempted to improve the efficiency of their Offer targeting through manual means. These have included manual organization of Services into known topic areas that Advertisers may select to place offers into. This strategy works somewhat when the content delivered by Services is well known and easily classed into categories or is static in nature. This approach does not work well for a dynamic medium with huge sets of rapidly changing content and the content is out of the control of the Service—which are attributes of the World Wide Web.

Other targeting techniques include requiring Users to specify their interest categories manually. These systems may work for small numbers of well-understood information content areas but are not practical for Services that span the breadth of the Internet. Furthermore, manual systems of specifying preferences are cumbersome for Users, which they subsequently abandon. This results in inaccurate preferences, misleading preferences or obsolete preferences, causing a mismatch between actual User interests and the information captured in manual preferences systems.

SUMMARY OF THE INVENTION

In view of the foregoing background, one object of the present invention is to improve the match between User interests and Advertisers' messages by transparently assessing the type of information that a User reviews over time.

Another object of the invention is to create a "profile" of interests of the User, which may be used to subsequently direct Offers.

A further object of the invention is to target Offers to individuals who have indirectly expressed interest in specific subject matter.

A more general object of this invention is to provide a higher User response rate per CPM.

According to one aspect of the invention, a method and system of this invention provides for profiling a User of the Internet according to predefined categories of interest that includes the following steps: First, content information of an Internet User is scanned to generate unknown data. This step takes place at any number of locations: the client's server, the client's computer or at an Internet hub. Next, the unknown data are processed to determine their relevance to predefined categories of interest. These categories include, for example, sports, games, business, investing, health, hobbies, technology, arts, politics, social issues, weather and news. Moreover, the relevance is indicated in a matching rating system, analyzing attributes such as length of time reviewing content information, frequency of encounter, recency, strength and closeness. With comparisons such as these, the method generates a match of the unknown data with the predefined categories to form a profile of the User.

To form a "recognizer" for use in profiling Internet User interests, the method and system of this invention includes collecting representative data sets of major areas of interests and processing the data sets by algorithms and weighted rules to form a recognizer. The above-described profiling may occur in real time or be delayed and may occur on the client's installation or remotely, for example, on a server installation.

Therefore, the objects of this invention are accomplished through a method system that scans information content and automatically and transparently assesses its subject matter. Over time, this invention accumulates a "profile" of interests of the User, which can be used to subsequently direct Offers.

An advantage of this invention is that it enables Services to target offers to individuals who have indirectly expressed interest in specific subject matter. For example, this will enable Services to automatically and transparently determine which Users have an interest in topics such as golf, luxury cars, medical information, sports equipment, music, etc. These topics are merely illustrative and not limiting. Once the Service has determined these preferences, it may then direct appropriate and matching advertising Offers to those Users.

Another advantage of this invention will be a higher response rate per CPM, i.e., golf advertisements will be shown only to those Service Users who have a strong interest in golf, as determined in the profile generated by Petitioner's technology.

Additional objects and advantages of this invention will be apparent from the following detailed description of preferred embodiments thereof, which proceeds with reference to the accompanying drawings.

DETAILED DESCRIPTION OF A PREFERRED EMBODIMENT OF THE INVENTION

Figure 1:
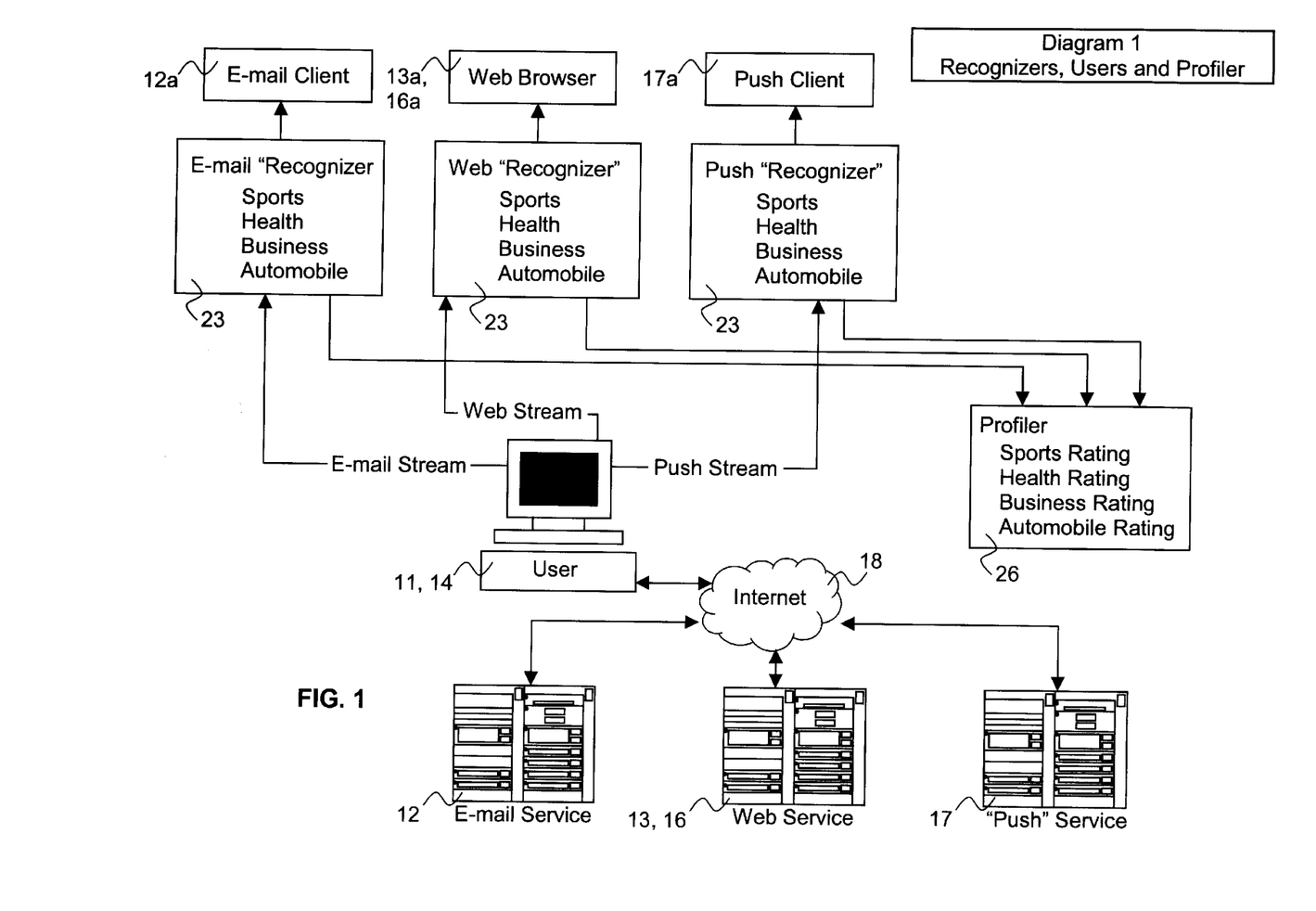
FIG. 1 shows the relationship between the Recognizers, the User and the Profiler according to this invention in connection with e-mail, Web and Push data streams.

This invention dynamically and transparently improves the targeting of Offers consisting of three major components. These three components work in conjunction with technologies of Services to target Offers to Users. Two of these components, scanning and handling various kinds of digital information are described in commonly-assigned patent application Ser. No. 09/164,940 filed Oct. 1, 1998 now U.S. Pat. No. 6,266,664, which is hereby incorporated by reference. Referring to FIG. 1, the scanning and analyzing capabilities extend to any type of digital content in systems such as the Web Browsers 11, E-mail Clients/Servers 12, UseNet Clients/Servers 13, Personal 14 and Server-based Search Engines 16.

Figure 2:
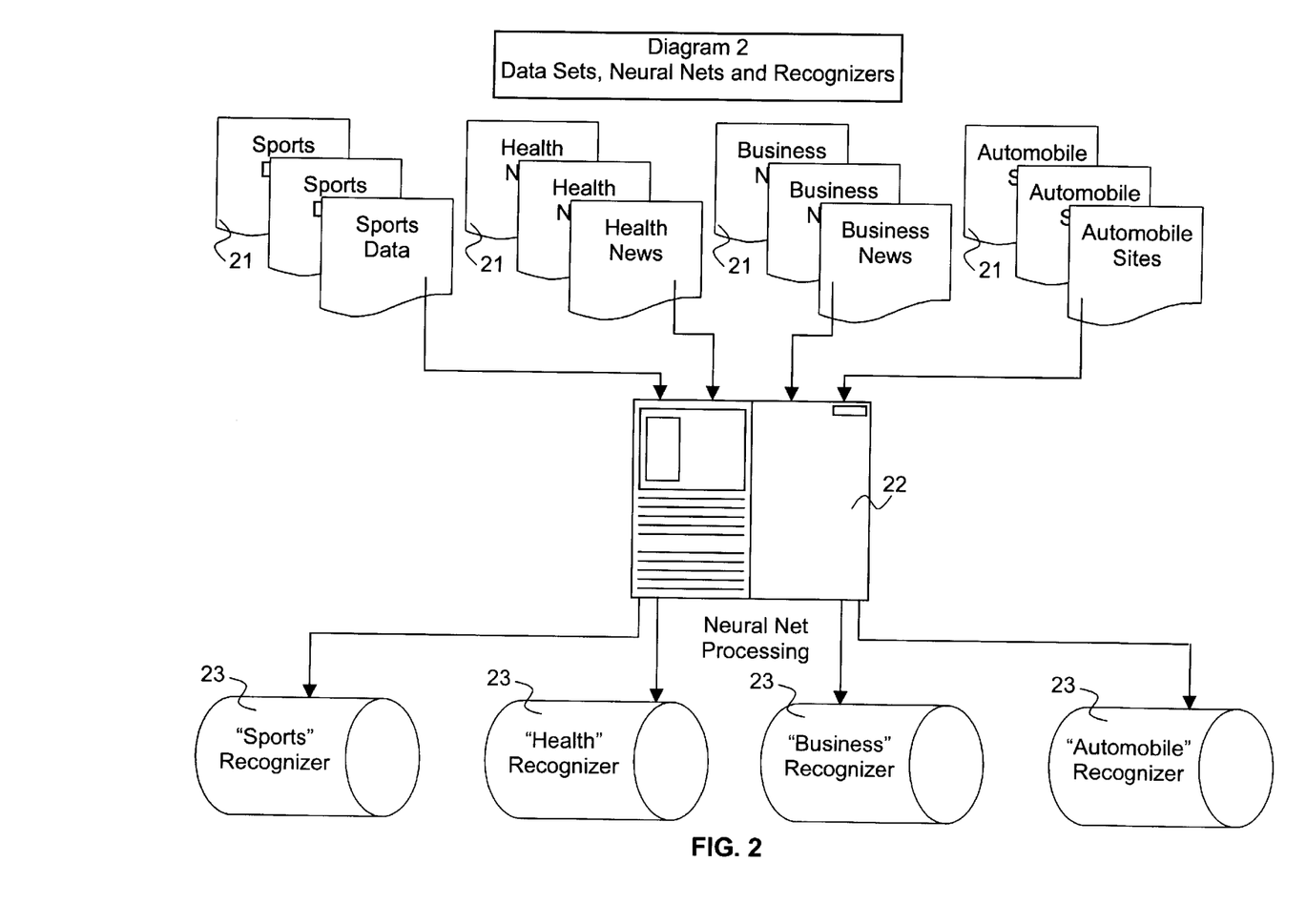
FIG. 2 shows the relationship between the Data Sets, Neural Net Processing and the Recognizers of this invention.

The two modules, scanning and analyzing, named in the above-referenced patent application are capable of determining the relevance of unknown data to a known data set through efficient analytic models. These modules are used in real time to assess the incoming data from Services to the Users of the Services for their relevance to the common (or specific) predefined categories of interest to Advertisers. Referring to FIG. 2, this is accomplished through collecting representative data sets of major areas of interest, the Data Sets 21, and using a developed set of algorithms and weighted rules necessary to analyze the unknown content for a match with Data Sets 21. The development of these algorithms and weighted rules is accomplished through the use of a three-tier feed-forward artificial neural network, a Neural Net 22, with a learning algorithm as described in the above-referenced patent application. Various artificial neural networks are commercially available that could be used for this purpose. The output from Neural Net 22 is algorithms and rules, the Recognizers 23, which in essence "recognize" a match of incoming, unknown data with Data Sets 21.

Recognizers 23 for common areas of interest to Advertisers include, but are not limited to, data sets related to sports, games, business, investing, health, hobbies, technology, arts, politics, social issues, weather and news. In addition, because Recognizers 23 are very small and compact, dynamically generated Recognizers 23 are used for electronic distribution and updates.

Recognizers are executed against incoming unknown data requested by Users. Again referring to FIG. 1, the statistical output from Recognizers 23 indicate whether a given set of unknown data received or sent through the Internet 18 has a good match to the installed Recognizers 23. For example, if a golfing Recognizer 23 is loaded and the User views golf-related Web Pages 13a, E-mail 12a, User Groups 16a or other digital content, the golfing Recognizer 23 returns a positive match for that Data Set 21.

Another element of this invention is the Profiler 26 that receives the output from the real-time analysis of Recognizers 23. Profiler 26 tracks and builds an aggregate statistical model, "Profile," of the User including quantitative analysis of the match, frequency, duration, age and other factors between unknown content reviewed by the User and the set of installed Recognizers 23.

The aggregate result of generating Profiler 26 is a prioritized and rated set of interest categories that is automatically generated for each User through the transparent and dynamic analysis of the frequency and time spent by the Users reviewing content that has a good statistical match with known Data Sets 21. The Profile generated by the system for each User is the output from the system and can subsequently be used to make highly targeted Offers.

Figure 3:
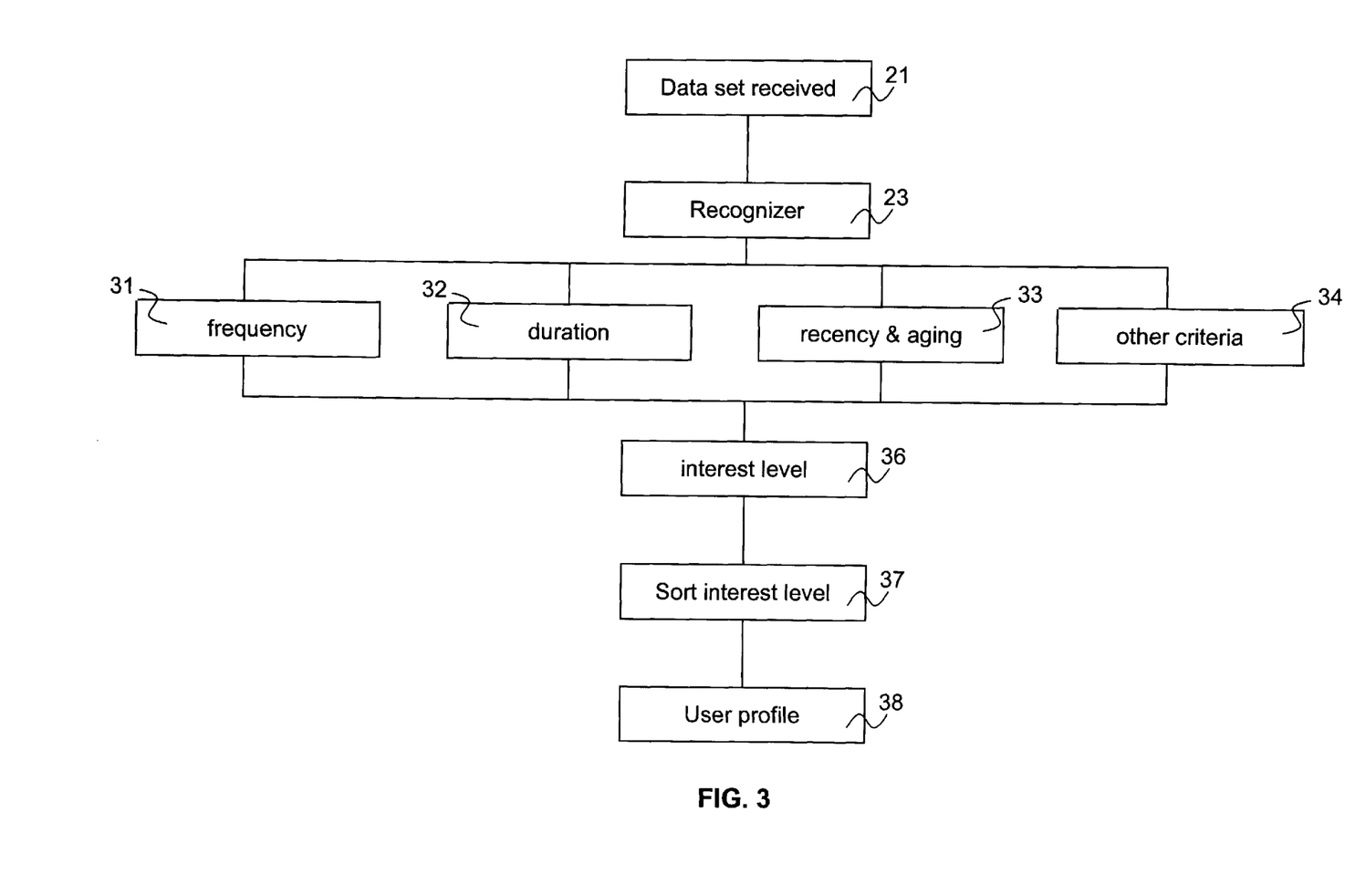
FIG. 3 is a flow chart of the operation to form a User profile of this invention.

Referring to FIG. 3, the Offer-managing software can use an aggregate of the interest ratings generated by Profiler 26 for each User, along with statistics generated by the Offer-managing software, to report the level of targeted Offers back to the Advertiser.

The method and system of this invention employs methods for scanning, analyzing and handling digital information content, described in the above-referenced patent application Ser. No. 09/164,940 now U.S. Pat. No. 6,266,664 to assess the match between known Data Sets 21 of subject matter and newly encountered information.

Referring to FIG. 3, each discrete unit of information newly encountered by Users is analyzed by Recognizers 23 against a set of known Data Sets 21 such as sports, news, heath information, etc. The return value of the analysis is a matching rating indicating the "strength" or "closeness" of the newly encountered data to known Data Sets 21. This analysis is done for each known Data Set 21 (or subject matter) of interest to the Service and Advertiser.

Additional information is captured regarding the use of such data by the User. Information including a frequency of encounter 31, a length of time reviewing 32 and a statistical measure of how recently the matching information was reviewed, along with an aging algorithm 33, among other criteria 34, is used to generate a "level of recent interest" rating 36 for each known Data Set 21. Optionally, a history may be recorded, including the location of the newly encountered information, for use in subsequent validation of results.

Figure 4:
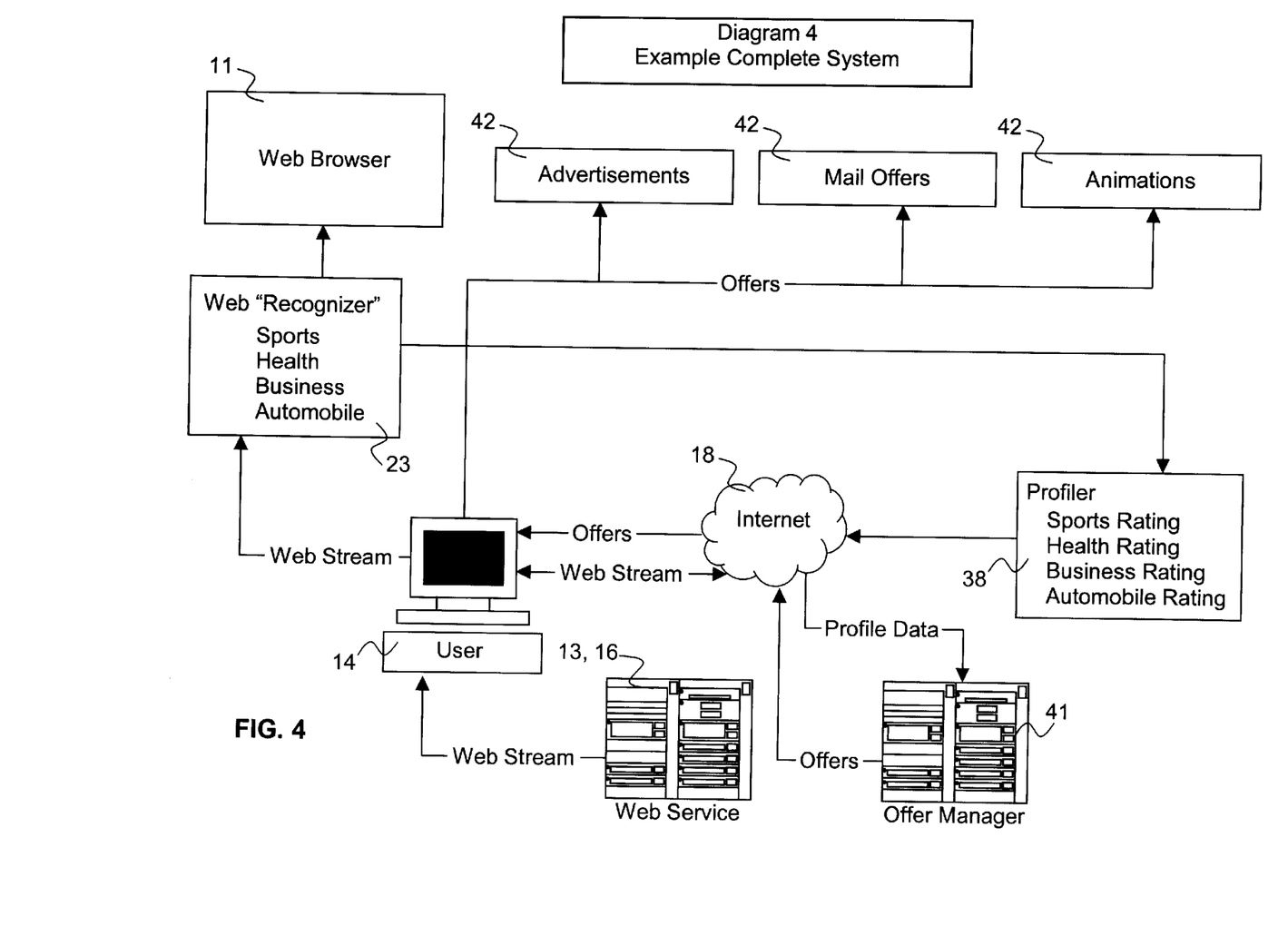
FIG. 4 shows the relationship between the Recognizers, the User, the Profiler and other components of the system and method of this invention.

The aggregate of this collected data, on a per data set basis, is mathematically combined to a single rating of "interest" level for each Data Set 21 for each User. These ratings can be sorted by highest "interest" first, through data sets of "No" interest at step 37. Referring to FIG. 4, this sorting can be done in real time to generate a profile 38 and reported out of the "Tracker" module incorporated with or in communication with the offer manager 41 into other modules responsible for delivering the Offers 42 that match the subject matter of highest interests.

Still referring to FIG. 4, the Services 13, 16 incorporating Profiler 38 and 41 identify which User is using the system. Profiles are preferably generated on a per-User basis. Typical installations require Users to "log in" to the Service, thereby allowing the Service to notify the "Tracker" which User Profile to update.

Services 13, 16 pass the discrete pieces of data into Recognizer 23 for the system to generate the appropriate rating data. Services 13, 16 may "tap" into the data at many different sources, including both realtime and delayed. Services 13, 16 may intercept communications traffic at the protocol or file layer of client and server platforms.

Profiles generated by Profiler 38 describe a graph of interest for each User. These are stored either on the client installation or the server installation and may or not be encrypted, depending upon the desires and privacy policies set by Services 13, 16 using the information. Additionally, personal information such as a user name, address, phone number, and other various forms of personal identification may be stripped from the profile to protect the user's anonymity. Full copies of the graphs are available for use by Services 13, 16, but privacy policies may dictate that only aggregate Profile rating is made available.

Users may have some options to review the history and aggregate results and may have the option to explicitly turn off tracking of specific subject matter. For example, Users may wish to disallow any reporting on frequency of use and may also flush the histories and graphs to reset the profiling functions.

The following is a sample list of applications for which the system and method of this invention are used:
1. E-mail Client/Server Systems—Analyzing and building Profiles from e-mail information. According to this invention, e-mail systems generate revenue through Offers by analyzing sent and received e-mail information and building Profiles based upon its content.
   Analysis and Profile building can be accomplished at either the Client or Server location within an e-mail system.
   E-mail systems include LANs, WANs, VPNs and ISPs that deploy e-mail information in any form of e-mail data standard such as SMTP, POP3, IMAP4, etc.
   Clients refers to any software loaded on desktop PCS, set top boxes and end-user display devices that display e-mail.
   Proxies and servers refer to any centralized computer system responsible for serving, routing, filtering and/or caching e-mail content.
2. Web Client/Proxy and Server—Analyzing and building Profiles from Web pages. This invention operates in conjunction with Web-based systems to generate revenue through Offers by analyzing viewed Web pages and building Profiles based upon their content.
   Web systems include LANs, WANs, VPNs and ISPs that deploy Web information in the form of HTML, XML and other Web data standards.
   Clients refers to any software loaded on desktop PCS, set top boxes and end-user display devices that display HTML, XML and other Web data.
   Proxies and servers refer to any centralized computer system responsible for serving, routing, filtering and/or caching Web content.
3. Chat Client/Proxy and Server—Analyzing and building Profiles from chat streams. This invention can also be used in conjunction with chat-based systems to generate revenue through Offers by analyzing chat discussions and building Profiles based upon their content.
   Chat systems include LANs, WANs, VPNs and ISPs that deploy chat information in the form of HTML, Java, TCP/IP, IRC or UDP chat protocols.
   Clients refers to any software loaded on desktop PCS, set top boxes and end-user display devices that display chat conversations.
   Proxies and servers refer to any centralized computer system responsible for serving, routing, filtering and/or caching chat content.
4. UseNet Client/Proxy and Server—Analyzing and building Profiles from UseNet information. Another example of an application of this invention is in conjunction with UseNet-based systems to generate revenue through Offers by analyzing viewed UseNet postings and building Profiles based upon their content.
   UseNet systems include LANs, WANs, VPNs and ISPs that deploy UseNet information in the form of NNTP.
   Clients refers to any software loaded on desktop PCS, set top boxes and end-user display devices that display UseNet data.
   Proxies and servers refer to any centralized computer system responsible for serving, routing, filtering and/or caching UseNet content.
5. "Push" Client and Server—Analyzing and building Profiles from "Push" information. Push-based systems can be used in conjunction with this invention to generate revenue through Offers by analyzing viewed Push information and building Profiles based upon its content.
   Push systems include LANs, WANs, VPNs and ISPs that deploy Push information in the form of channels, typically utilizing HTML or TCP/IP protocols.
   Clients refers to any software loaded on desktop PCS, set top boxes and end-user display devices that display HTML, XML, "ticker" and other Push data.
   Proxies and servers refer to any centralized computer system responsible for serving, routing, filtering and/or caching Push content.
6. "Portal" Client and Server—Analyzing and building Profiles from Web page information. Also, Web-based "Portal" or "Community" systems can be used in conjunction with this invention to generate revenue through Offers by analyzing viewed Web pages and building Profiles based upon their content.

Portal systems include LANs, WANs, VPNs and ISPs that deploy Web information in the form of HTML, XMI and other Web data standards, for the purpose of organizing and directing the Web experience for the User.

Clients refers to any software loaded on desktop PCS, set top boxes and end-user display devices that display HTML, XML and other Web data.

Proxies and servers refer to any centralized computer system responsible for serving, routing, filtering and/or caching Portal content.

7. Search Engine Client and Server—Analyzing and building Profiles from Web page information. Additionally, this invention can be used in conjunction with search engine systems to generate revenue through Offers by analyzing viewed search queries and results and building Profiles based upon their content.

Search engine systems include LANs, WANs, VPNs and ISPs that deploy search queries and results in the form of HTML, XML and other Web data standards.

Clients refers to any software loaded on desktop PCS, set top boxes and end-user display devices that display HTML, XML and other Web data related to search queries and results.

Proxies and servers refer to any centralized computer system responsible for serving, routing, filtering and/or caching search queries and results.

It will be apparent to those having skill in the art that many changes may be made to the details of the above-described embodiment of this invention without departing from the underlying principles thereof. The scope of the present invention should, therefore, be determined by the following claims.

What is claimed is:

1. A method for creating an initial interest profile for an Internet user comprising:

scanning content information responsive to use of such content by the Internet user to generate a set of unknown data;

collecting representative data sets of areas of interest to develop a corresponding plurality of predefined categories;

processing the unknown data using a plurality of category based recognizers to compare the unknown data to the plurality of predefined categories to determine the unknown data set's relevance to each of the predefined categories; and generating one or more matches of the unknown data set with the corresponding predefined categories of the category based recognizers and aggregating the one or more matches on a per-data set basis to create said initial interest profile of the user.

2. A method as recited in claim 1 wherein the initial interest profile of the user provides a level of interest for the matched ones of the predefined categories of the category based recognizers.

3. A method as recited in claim 1 wherein the relevance of unknown data to predefined categories is measured in a matching rating system.

4. A method as recited in claim 3, wherein the matching rating system analyzes the unknown data according to length of time reviewing the content information.

5. A method as recited in claim 3, wherein the matching rating system analyzes the unknown data according to frequency of encounter.

6. A method as recited in claim 3, wherein the matching rating system analyzes the unknown data according to a statistical measure of how recently the matching information was reviewed.

7. A method as recited in claim 3, wherein the matching rating system analyzes the unknown data according to an aging algorithm.

8. A method as recited in claim 3, wherein the matching rate indicates strength of the unknown data with respect to the predefined categories.

9. A method as recited in claim 3, wherein the matching rate indicates closeness of the unknown data with respect to the predefined categories.

10. A method as recited in claim 1, wherein one of the predefined categories is related to one of sports, games, business, investing, health, hobbies, technology, arts, politics, social issues, weather and news.

11. A method as recited in claim 1, where the content information is in the form of e-mail.

12. A method as recited in claim 1, where the content information is in the form of Web pages.

13. A method as recited in claim 1, where the content information is in the form of chat streams.

14. A method as recited in claim 1, where the content information is in the form of UseNet Information.

15. A method as recited in claim 1, where the content information is in the form of push information.

16. A method as recited in claim 1, where the method is carried out by an Internet Service Provider.

17. A method as recited in claim 1, wherein the user has an Internet communication device and the method is carried out on the user's Internet communication device.

18. A method as recited in claim 1, wherein the user communicates on the Internet through an Internet hub and the method is carried out at the hub.

19. A method as recited in claim 1 further comprising reporting the initial interest profile to a tracker that operates in conjunction with an offer manager to prepare and dispense offers to the user based upon the initial user profile.

20. A method of creating an initial interest profile of an Internet user, comprising:

collecting representative data sets of areas of interest to develop a corresponding plurality of pre-defined categories;

processing the data sets by algorithms and weighted rules to form a first category based recognizer for one of the plurality of pre-defined categories to be used in conjunction with other similarly formed category based recognizers of the other pre-defined categories;

scanning content information responsive to the use by an Internet user to form an unknown data set;

processing the unknown data set using said first category based recognizer of the pre-defined category and other similarly formed category based recognizers of the other pre-defined categories to determine the unknown data set's relevance to each of the pre-defined categories; and generating one or more matches of the unknown data set with the pre-defined categories of the category based recognizers and aggregating the one or more matches on a per-data set basis to create an initial interest profile of the user.

21. A method as recited in claim 20, wherein said plurality of category based recognizers of other predefined categories are formed in a similar manner to said first category based recognizer.

22. A method as recited in claim 20 wherein the recognizer is related to one of sports, games, business, investing, health, hobbies, technology, arts, politics, social issues, weather and news.

23. A method as recited in claim 20, wherein the processing step comprises:
   breaking down the content information into discrete pieces of data; and
   passing the discrete pieces of data into the category based recognizers to be compared to the corresponding pre-defined categories to generate one or more matches of the unknown data set with the corresponding pre-defined categories of the category based recognizers.

24. A method as recited in claim 20, wherein the processing step occurs in real time.

25. A method as recited in claim 20, wherein the processing step is delayed.

26. A method as recited in claim 20 wherein the initial profile is stored on the client installation.

27. A method as recited in claim 20 wherein the initial profile is stored on the server installation.

28. A method as recited in claim 20 wherein the processing of unknown data is circumventable by the user.

29. A system for creating an initial interest profile for a user of the Internet, comprising:
   a processor configured to scan content information responsive to the use by an Internet user to generate an unknown data set;
   a processor configured to collect representative data sets of areas of interest to develop a corresponding plurality of predefined categories;
   a processor configured to process the unknown data using a plurality of category based recognizers corresponding to the plurality of pre-defined categories to determine the unknown data set's relevance to each of said predefined categories; and
   a processor to generate one or more matches of the unknown data set with the predefined categories and aggregating the one or more matches on a per-data set basis to create said initial interest profile of the user.

30. A system for creating an initial profile of an Internet user, comprising one or more processors configured to:
   collect representative data sets of areas of interest to develop a corresponding plurality of pre-defined categories;
   process the data sets by algorithms and weighted rules to form a plurality of category based recognizers, one for each of said pre-defined categories to be used;
   scan content information responsive to the use of such content by an Internet user to generate an unknown data set;
   process the unknown data set against said plurality of category based recognizers to determine the unknown data set's relevance to each of the plurality of pre-defined categories; and
   generate one or more matches of the unknown data set with the pre-defined categories of the category based recognizers and aggregating the one or more matches on a per-data set basis to create an initial interest profile of the user.

31. A system for creating and using an initial interest profile for an Internet user, comprising one or more processors to:
   scan content information responsive to use of such content by the Internet user to generate a set of unknown data;
   collect representative data sets of areas of interest to develop a corresponding plurality of predefined categories;
   process the unknown data using a plurality of category based recognizers to compare the unknown data to the plurality of pre-defined categories to determine the unknown data set's relevance to each of said predefined categories;
   generate one or more matches of the unknown data set with the predefined categories and aggregating the one or more matches on a per-data set basis to create said initial interest profile of the user; and
   report the initial interest profile to a tracker that operates in conjunction with an offer manager to prepare and dispense offers to the user based upon the user's initial interest profile.

32. A system as recited in claim 31, wherein the offers dispensed to the users are dispensed via the Internet.

* * * * *